(12) United States Patent
Diller et al.

(10) Patent No.: US 8,611,488 B2
(45) Date of Patent: Dec. 17, 2013

(54) DEBRIS EXCLUSION AND RETENTION DEVICE FOR A FUEL ASSEMBLY

(75) Inventors: Peter Ray Diller, Wilmington, NC (US); David Grey Smith, Leland, NC (US); Richard C. Longren, Wilmington, NC (US); Gerald A. Luciano, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 23 days.

(21) Appl. No.: 13/026,940

(22) Filed: Feb. 14, 2011

(65) Prior Publication Data
US 2012/0207262 A1    Aug. 16, 2012

(51) Int. Cl.
*G21C 19/42*    (2006.01)
(52) U.S. Cl.
USPC ............................................. 376/313; 376/347
(58) Field of Classification Search
USPC .................................................. 376/313, 347
See application file for complete search history.

(56) References Cited

U.S. PATENT DOCUMENTS

| 5,180,545 | A | 1/1993 | Grattier |
| 5,483,564 | A | 1/1996 | Matzner et al. |
| 6,175,606 | B1* | 1/2001 | Soderberg ..................... 376/313 |
| 7,149,272 | B2 | 12/2006 | Soderlund et al. |
| 2006/0283790 | A1* | 12/2006 | Elkins et al. ................... 210/335 |
| 2009/0092217 | A1* | 4/2009 | DeFilippis et al. ........... 376/313 |
| 2012/0273407 | A1* | 11/2012 | Haque et al. .................. 210/335 |

* cited by examiner

*Primary Examiner* — Timothy A Brainard
(74) *Attorney, Agent, or Firm* — Parks IP Law LLC; Stephen J. Terrell (57) ABSTRACT

A debris exclusion and retention device traps and retains foreign material within the lower tie plate of the fuel assembly utilizing the existing flow paths within the lower tie plate, and without redirecting coolant flow. Flow through the inlet nozzle of the lower tie plate into an enlarged lower tie plate housing creates strong jet impingement against the center of the lower tie plate grid or debris filter, if present, which has a tendency to push debris to the periphery of the lower tie plate. Low flow zones around the periphery of the lower tie plate allow debris to fall back toward the inlet nozzle. The retention device traps and retains debris in these low flow zones without impacting existing flow patterns in the lower tie plate. Thus, the retention device has minimal or no impact on lower tie plate pressure drop.

17 Claims, 9 Drawing Sheets

Fig_1

Fig. 3

Fig_4 (PRIOR ART)

Fig_5 (PRIOR ART)

Fig_6

FIG. 12

DEBRIS EXCLUSION AND RETENTION DEVICE FOR A FUEL ASSEMBLY

TECHNICAL FIELD

The invention relates generally to nuclear reactors, and more specifically, to a debris exclusion and retention device for a reactor fuel assembly.

BACKGROUND OF THE INVENTION

Nuclear reactors, such as boiling water reactors (BWR), have a core that contains fuel assemblies that enclose fuel rods. As the nuclear reactor is a closed circulation system, debris tends to accumulate within the system. Debris in this context refers to any solid material entrained in the fluid flow. Debris can include materials left over from reactor construction, corrosion byproducts, and detritus introduced or dislodged during outages and repair services.

Accumulation of debris within a fuel assembly is potentially damaging to fuel rods. For example, as debris particles lodge against the fuel rods, coolant traveling through the fuel bundle creates turbulence which causes the captured debris particles to vibrate rapidly against the fuel rod cladding, resulting in its perforation or rupture. Fuel rods with damaged cladding are sometimes referred to as "leakers." If a sufficient number of leakers are present, the plant may be forced to shut down or to operate at less than optimum efficiency in compliance with regulations and to address safety concerns. In either case, it is highly desirable to minimize the entrance of foreign debris into the fuel assemblies.

To prevent debris from entering a fuel assembly, coolant that flows through the fuel assembly is typically filtered at the lower tie plate of the fuel assembly. In this fashion, debris can be prevented from entering into the fuel assembly depending on the effectiveness of the selected filter. This impeded debris simply accumulates within the lower tie plate, but only so long as there is sufficient forward coolant flow through the fuel assembly. The debris that has accumulated within the cavity of the lower tie plate during reactor operations becomes dislodged due to reverse or stagnant coolant flow conditions, or in reaction to an internal or external vibration source. Escape is very likely to occur, for example, as a fuel assembly is moved above the reactor core, which is common during reactor shut down and refueling. As the fuel assembly is lifted upward, the speed of its ascent causes coolant to flow back through the fuel assembly, thereby dislodging (i.e., backwashing) debris that had accumulated in the filter. Once dislodged, the debris falls out of the lower tie plate of the fuel assembly that is being transported and into the lower plenum, or worse, into the vulnerable upper ends of fuel assemblies that are positioned below, in the reactor core.

Debris that has been filtered and has accumulated within the lower tie plate cavity during reactor operations can also backwash out of the lower tie plate upon significant reduction of flow, for example, where reactor flow is reduced at low or no power. This debris will be reintroduced to the lower tie plate in subsequent reactor operation, allowing for a subsequent opportunity for infiltration of the debris into the fuel assembly.

Accordingly, although highly effective filters have been developed, the problem of retaining the debris that has been impeded by the filters remains. Previous attempts to address the debris retention problem employ various filtering structure designs that attempt to prevent debris from being dislodged from the lower tie plate. However, to do so the prior designs substantially change the direction and the momentum of the normal flow pattern of coolant through the lower tie plate, which creates an undesirable pressure drop within the fuel assembly, which adversely affects reactor operation. Further, prior attempts to redesign the structure of conventional lower tie plates resulted in devices that are costly and complicated to manufacture.

BRIEF DESCRIPTION OF THE INVENTION

The various embodiments of the invention provide a retention device that advantageously utilizes natural flow paths within a lower tie plate of a fuel assembly to entrap filtered debris within the lower tie plate. The problem of retention of the debris is solved, as the retention device entraps debris that has been impeded by an exclusion device, such as an independent or integral debris filter. Together, the exclusion device and the retention device cooperate to continuously flush the internal cavity of the lower tie plate, thereby mitigating undesirable levels of flow resistance. This "backwash" flushing removes debris trapped or embedded within cracks and crevices of the lower tie plate, all the while using the coolant flow that is present in the fuel assembly during normal reactor core operations. In addition, by using the natural coolant flow patterns, the retention devices have, at most, minimal impact on the pressure drop in the core.

More specifically, according to one aspect, the exemplary retention devices are configured such that the coolant flow through the center opening of an inlet nozzle of the lower tie plate has a higher flow velocity than the coolant flow in low flow zones that naturally form along the internal walls of the lower tie plate, which results in the diversion and accumulation of debris along the internal walls and corners of the lower tie plate. In certain embodiments, this flow dynamic is accomplished by expanding an interior cavity of the lower tie plate.

One embodiment is a debris retention assembly for a fuel assembly, the debris retention assembly including a debris filter that is disposed across a flow path along which coolant travels into the fuel assembly. The debris filter is configured to impede the flow of debris that is propelled by the flow of coolant, so as to prevent introduction of the debris into the fuel assembly. The debris retention assembly also includes a debris retention device that is positioned upstream from the debris filter with respect to the direction of coolant flow and also disposed across the flow path. The debris retention device is configured to entrap debris that has been impeded by the debris filter to prevent escape of the debris from the debris retention assembly. Moreover, the debris retention device entraps debris without redirecting coolant flow. Rather, the debris retention device utilizes the vortices that naturally exist in a BWR lower tie plate to resist backwash and to retain loose debris carried by the vortices to the periphery of the debris retention device. To do so, the debris retention device includes a forward flow channel that resists debris escape under reverse flow, such as with an array of cylindrical cells that allow flow that is normal to the plane of the forward flow channel and resists tangential flow. A straining plate, or series of straining plates, encircles the forward flow channel, such that backwater and vortices carrying debris deposit the debris onto the straining plates. Each straining plate is perforated, and impervious dead zones may be disposed between straining plates or may interrupt perforated sections of a straining plate.

Another embodiment is a lower tie plate for a fuel assembly that incorporates a debris retention assembly. The lower tie plate includes an inlet nozzle for receiving coolant into the fuel assembly along a flow path, a housing that expands outwardly with respect to the inlet nozzle to define a lower tie plate cavity, and the debris retention assembly, which is permanently or removably enclosed within the housing. Again, the debris retention assembly includes a debris filter and a debris retention device that is positioned upstream from the debris filter.

According to one aspect of the embodiments, a debris retention cavity is defined between debris retention device and the debris filter, the debris retention cavity extending into the low flow zones that naturally result from the flow dynamics and geometries of the lower tie plate. To entrap debris, the debris retention device includes a forward flow channel that resists reverse flow of coolant without impeding coolant flow, and is disposed in a high flow zone that is surrounded by the peripheral low flow zones. In certain embodiments, the forward flow channel is configured to divert debris that is released from the debris filter under low flow or reverse flow conditions, or that avoids the debris filter by flowing into a low flow zone, by directing the debris into at least one straining plate in the low flow zone.

In certain embodiments, the exemplary retention devices can be retrofitted in to existing fuel assembly designs, either independently to cooperate with an existing debris filter, or as part of an assembly that includes both elements.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DETAILED DESCRIPTION OF THE INVENTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary Environment

Figure 1:
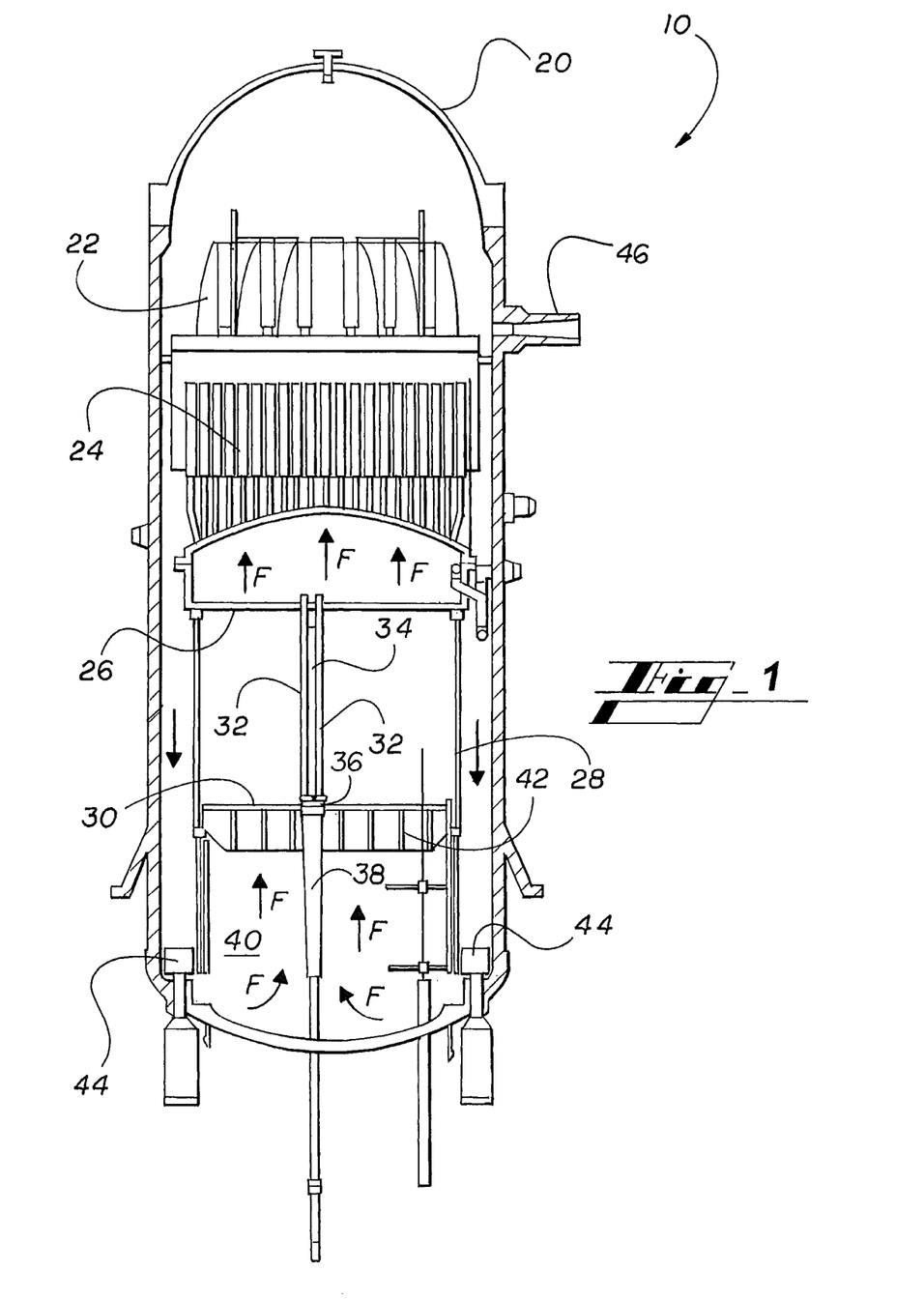
FIG. 1 is a schematic cross-sectional view illustrating the structure of a reactor pressure vessel according to an exemplary environment of the invention.

The exemplary environment in which the various embodiments of the invention will be described is a boiling water reactor (BWR). Referring to FIG. 1, the general structure of a reactor pressure vessel (RPV) 10 is illustrated. The RPV 10 includes a reactor pressure vessel head 20, a steam dryer 22, a steam separator 24, a top guide 26, a core shroud 28, a core support plate 30, fuel assemblies 32, control rods 34, fuel support members 36, control rod guide tube 38, a lower plenum 40, reinforcing beams 42, recirculation pumps 44, and main steam lines 46. Coolant flow F cools the components of the RPV 10.

Pressure is generated in the lower plenum 40 by the recirculation pumps 44 such that coolant (e.g., water) flows from the lower plenum 40 into the fuel assemblies 32. In the fuel assemblies 32, the coolant is heated to produce a two-phase flow including steam and liquid components. The steam and liquid components are separated from the flow by the reactor systems including the steam separators 24 and the steam dryers 22. For example, steam is separated from the coolant flow by the steam separators 24 and then directed into the steam dryers 22 to remove additional moisture that may remain. Thereby, pressurized steam is produced that is now directed by way of the main steam line 46 into the reactor's turbine building (not shown). The pressurized steam that has been generated is then directed into the turbine. Water that is separated from the flow by the steam separators 24 and the steam dryers 22 is re-directed back down and into the recirculation pumps 44.

Fuel Assembly and Fuel Support

Referring to FIG. 1, the upper ends of the fuel assemblies 32 are supported by the top guide 26 and the lower ends of the fuel assemblies 32 are supported by the fuel support members 36. Generally described, the fuel support member 36 is configured so as to support four fuel assemblies 32 in a lattice arrangement and to direct coolant flow from the lower plenum 40 upwards and into each of the four nuclear fuel assemblies 32, individually. The fuel support member 36 is inserted into the upper end of the control rod guide tube 38 so as to be positioned at the upper end of the control rod guide tube 38.

Figure 2:
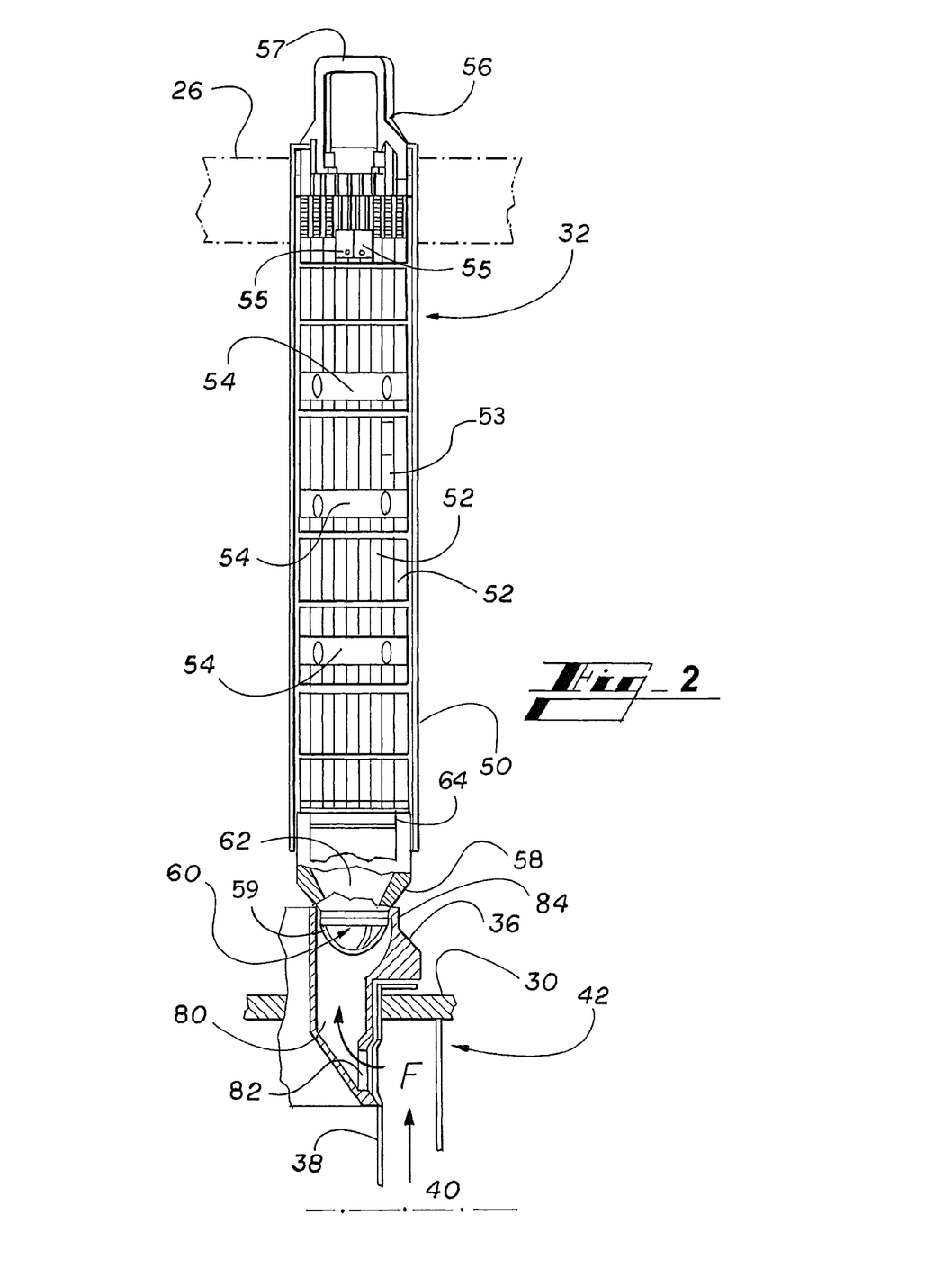
FIG. 2 is a partial cross-sectional elevation view illustrating a fuel assembly and a fuel support member in the reactor's core of FIG. 1.
Figure 3:
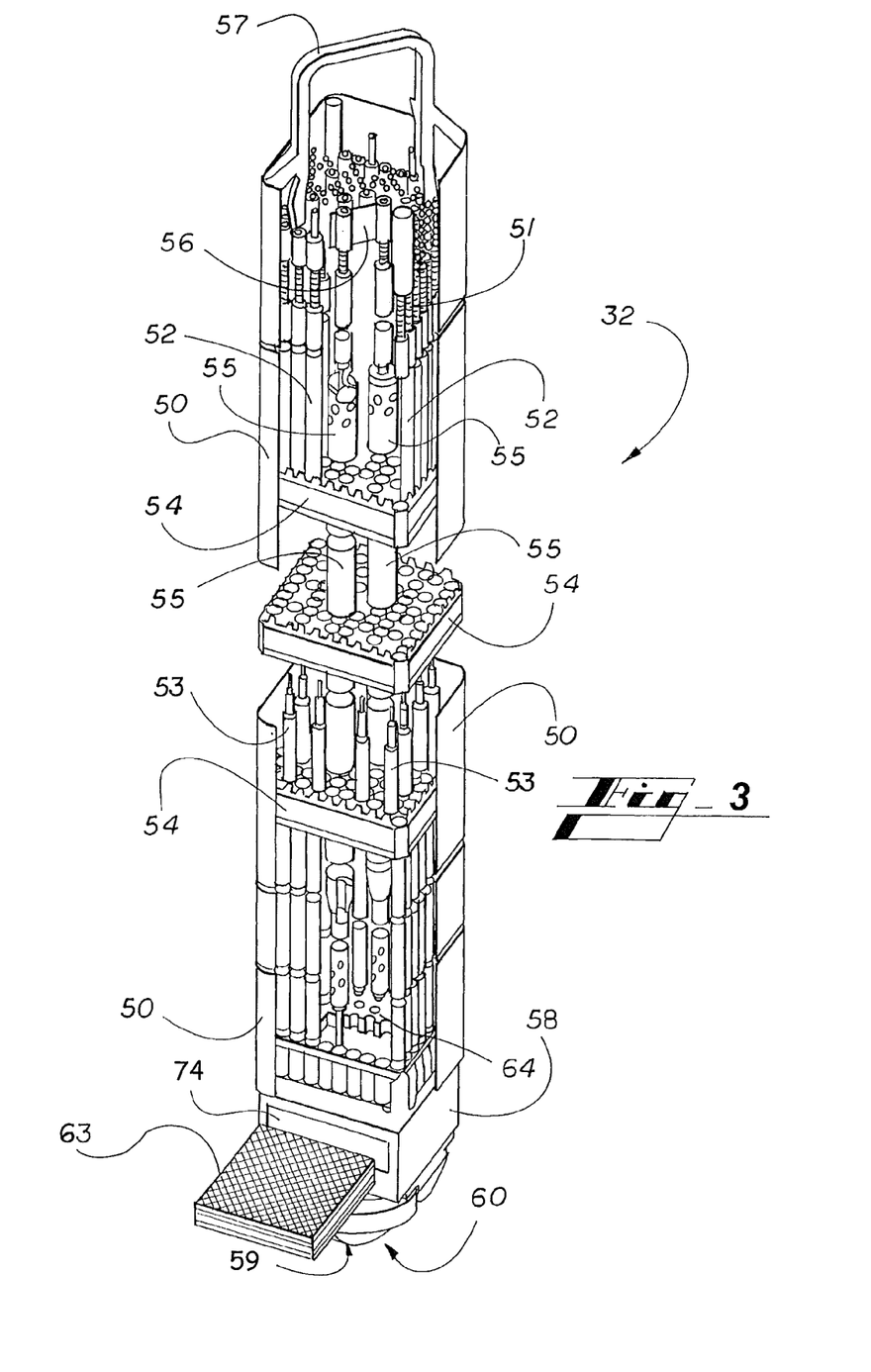
FIG. 3 is an exploded partial perspective view of the fuel assembly of FIG. 2.

Referring to FIGS. 2 and 3, the fuel assembly 32 includes a hollow metal channel 50, expansion springs 51, full length fuel rods 52, part-length fuel rods 53, fuel spacers 54, water rods 55, an upper tie plate 56 with a handle 57, and a lower tie plate 58. The hollow metal channel 50 has an elongated shape with a square cross-section and upper and lower open ends in which the upper tie plate 56 and lower tie plate 58 are received. The full length fuel rods 52 and the part-length fuel rods 53 are arranged in parallel and contain fissionable material. The fuel spacers 54 support both the full length fuel rods 52, the part-length fuel rods 53, and the water rods 55 at several positions along the entire length of the fuel assembly once the assembly is placed within the hollow metal channel 50. The upper and lower tie plates 56, 58 secure the upper and the lower ends of the full length fuel rods 52, while the lower ends of the part-length rods 53 are secured only to the lower tie plate 58. This assembly ensures that the coolant can pass through and around each of the fuel rods 52 and 53. In FIGS. 2 and 3, the fuel assembly 32 may also include at least one water rod 55.

In operation, the hollow metal channel 50 is vertical within the reactor's core, the upper tie plate 56 is positioned at the top opening of the hollow metal channel 50, which contains the components of each fuel assembly 32. The lower tie plate 58 is positioned at the bottom opening of the hollow metal channel 50, and the fuel spacers 54 are positioned at various locations along the interior length of the hollow metal channel 50. The fuel spacers 54 and the tie plates 56, 58 are configured so as to allow coolant flow through the fuel assembly 32. During normal operation, coolant flows in the flow direction F through the lower tie plate 58, over the fuel rods 52 and 53, along the interior length of the hollow metal channel 50 and then out through the top of the upper tie plate 56. Debris from reactor 10 systems can be entrained in the coolant flow and introduced to the fuel assembly 32 during normal operation.

Lower Tie Plate

Figure 4:
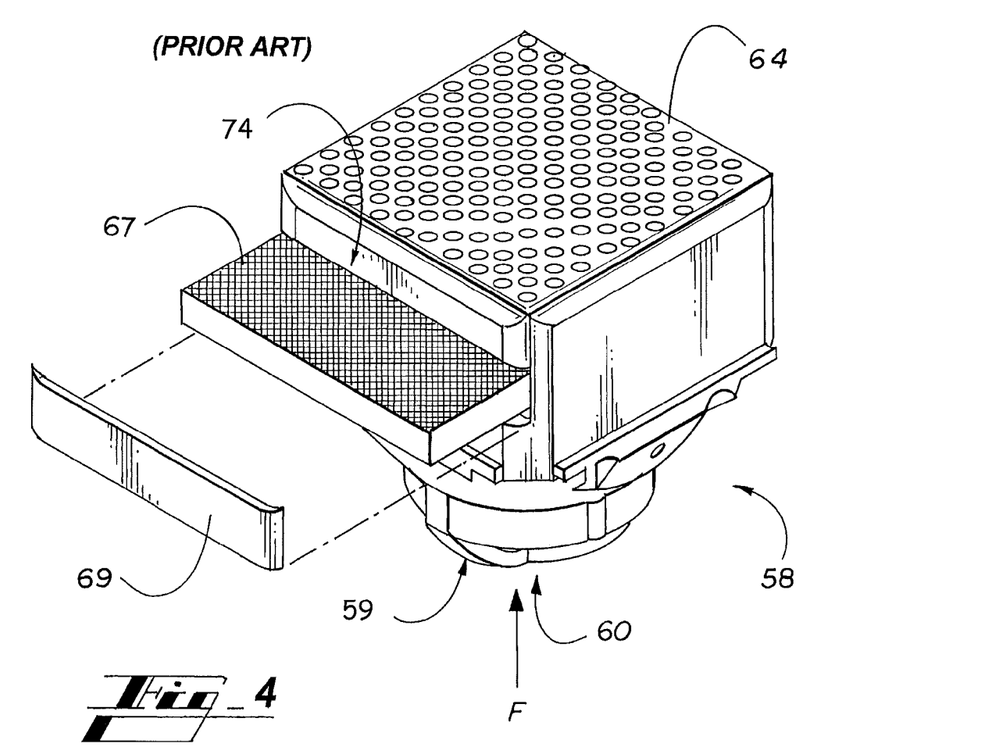
FIG. 4 is an exploded perspective view, showing a Prior Art example of a lower tie plate with a filter assembly that can be used within a fuel assembly in FIG. 3.

Referring to FIGS. 2-4, the lower tie plate 58 includes an inlet nozzle 60 that leads to a lower tie plate cavity 62, in which a filter cartridge 63 is disposed below a lower tie plate grid 64. The lower tie plate grid 64 is located at an upper end of the lower tie plate cavity 62 and supports the lower end plugs for the fuel rods 52 and 53. The lower tie plate grid 64 directs the flow of coolant into the fuel assemblies 32 and between all of the fuel rods 52 and 53 and the water rods 55.

The lower tie plate 58 further includes a bail 59, which extends outward and across the inlet nozzle 60. Generally, the bail 59 is configured to facilitate directing the lower end of the lower tie plate 58 of the fuel assembly 32 so as to be received by the fuel support member 36.

Fuel Support Member

Referring to FIG. 2, the fuel support member 36 includes a lower side entry orifice 82 that is configured to direct flow F from the lower plenum 40, upwards and through the support chamber 80 and into the fuel assembly 32. The support chamber 80 leads from a lower side entry orifice 82 where direct flow F enters from below.

When the lower tie plate 58 is received within the support chamber 80, the bail 59 extends into the conical portion of the support chamber 80 through the receiving orifice 84. The outer inclined surface of the lower tie plate 58 forms a mechanical seal against a lip of the receiving orifice 84. As such, the support chamber 80, the lower tie plate 58, and the hollow metal channel 50 provide a substantially continuous channel that directs the coolant flow from the lower plenum 40 through the support chamber 80 and upwards through the fuel assembly 32 resting atop of each fuel support 36.

Filter Cartridge

Referring to FIGS. 6-12, various exemplary embodiments of a debris retention assembly 63 for use in a lower tie plate 58 is further described. For purposes of comparison, and not of limitation, an exemplary prior art debris filter cartridge 67 (shown in FIGS. 4 and 5) is a single stage filter system that is positioned across the coolant flow F as it enters the inlet nozzle 60 of the lower tie plate, moves through the housing 62, and exits through the lower tie plate grid 64. As discussed above, the debris filter 67 may function well under steady flow conditions to impede debris from migrating into the fuel assembly, but if flow ceases or reverses, the debris can escape and become mobile again. Also, flow resistance may divert some backwater down through the inlet nozzle 60, allowing debris to evade filtration.

Figure 7:
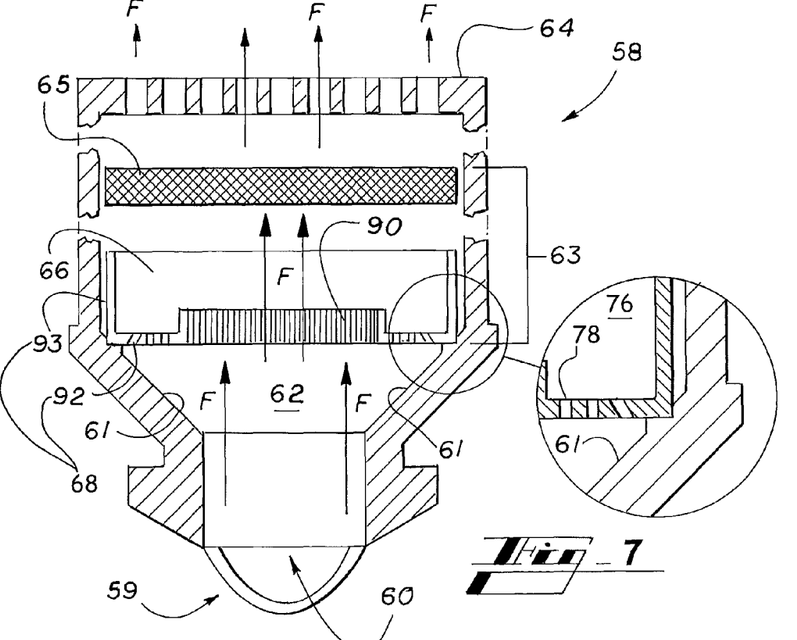
FIG. 7 is a cross-sectional, exploded view of lower tie plate with debris retention assembly of FIG. 6.

The various aspects of the present invention beneficially eliminate the problem of escaping debris with an integrated debris retention assembly 63 that both filters the flow and entraps the debris, thereby preventing its escape once its flow through the lower tie plate is impeded. In contrast to the prior art devices, the exemplary debris retention assembly 63 is at least a dual stage entrapment system that includes a debris filter 65 and debris retention device 66. FIG. 7 is an exploded cross-sectional view of a lower tie plate 58 with a fully assembled debris retention assembly 63 for a nuclear fuel assembly 32. The debris retention device 66 contains a debris tray 68, which is defined in part by a peripheral band 93 and one or more straining plates 92 interrupted by dead zones 70 (see FIG. 12). The straining plates 92, which may be integral to the peripheral band 93, have perforations 78 in certain embodiments, as will be discussed. The debris retention device 66 is further defined by a forward flow channel 90 that provides structure to the debris retention assembly 63, resists reverse flow of debris, and adds additional filtering capability, without adversely impacting performance in forward flow conditions. A peripheral band 93 encompasses all of these components as it defines the walls of the debris retention assembly 63. The peripheral band 93 has an outer surface that may be contoured with features, such as raised detents 72, which aid positioning, stability, and retention within the lower tie plate 58.

Figure 6:
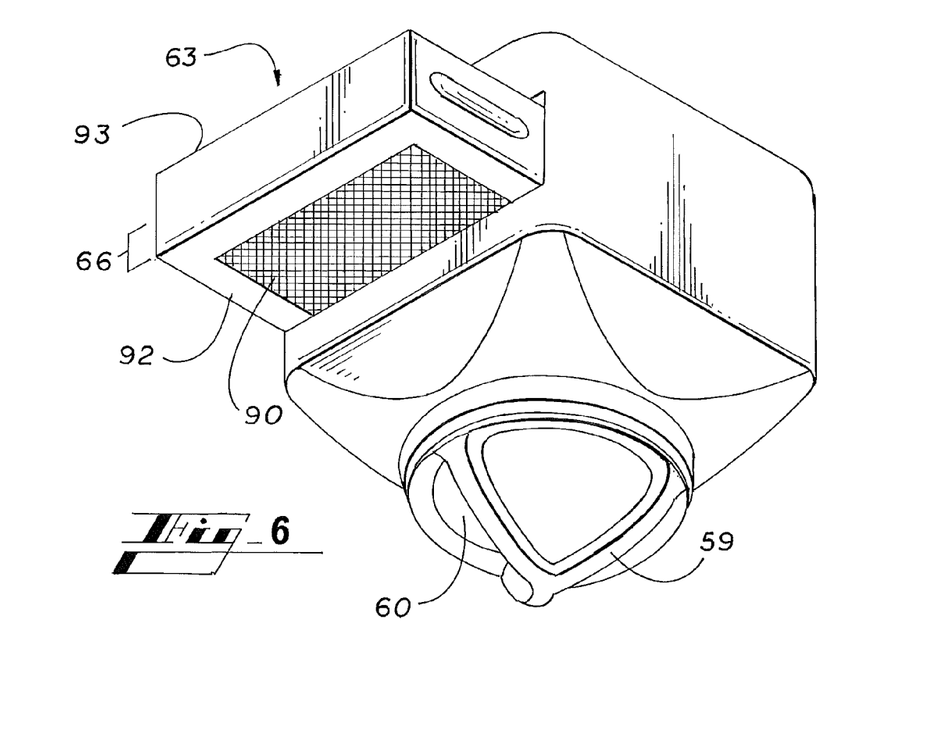
FIG. 6 is a perspective view of a lower tie plate with debris retention assembly in accordance with one embodiment.
Figure 8:
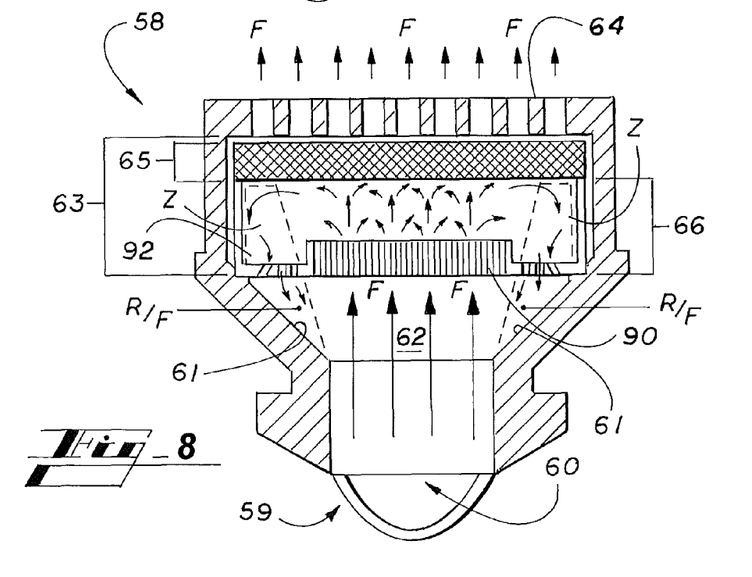
FIG. 8 is a cross-sectional view of the lower tie plate with debris retention assembly illustrating the coolant flow pattern for comparison to FIG. 5.
Figure 12:
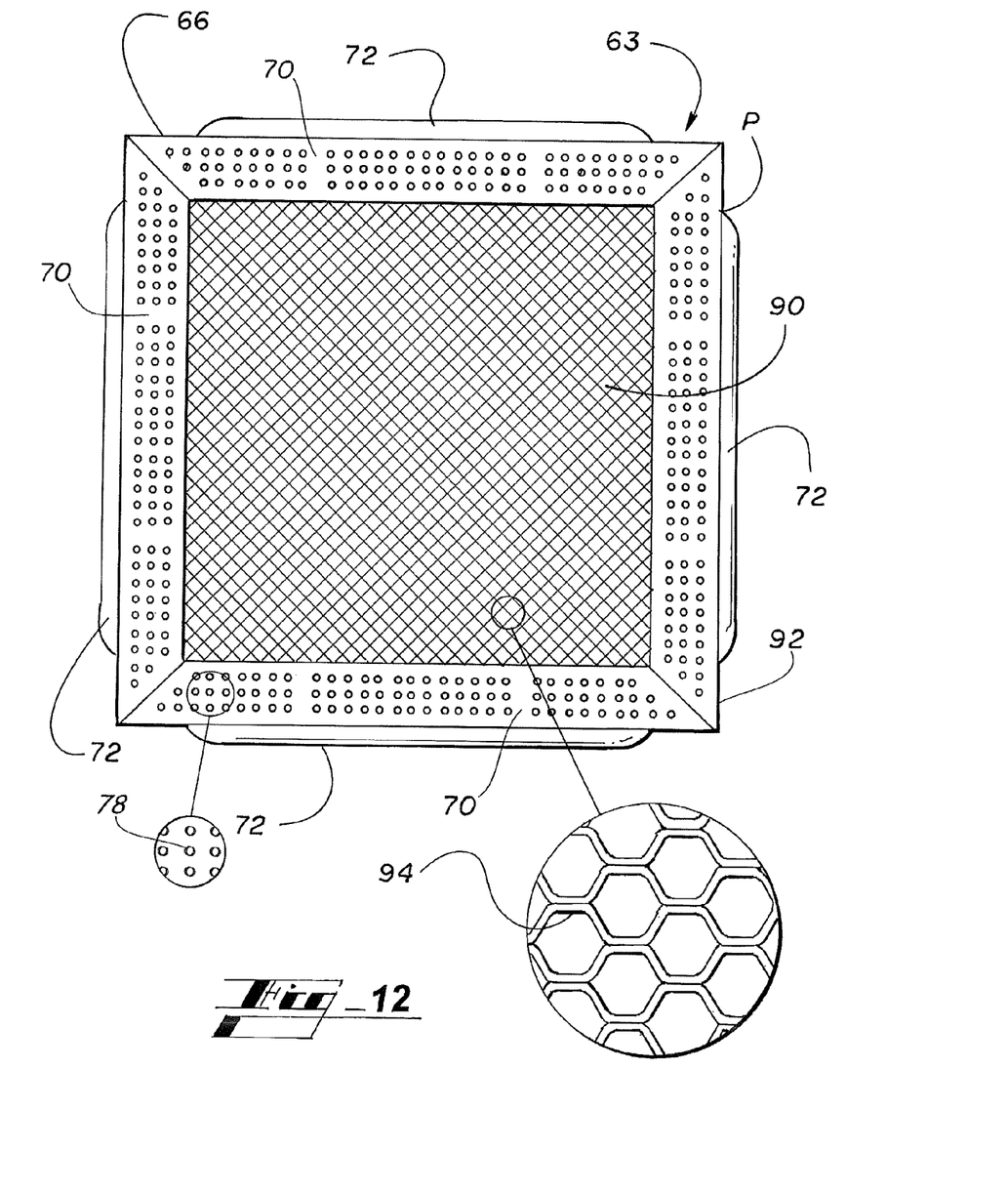
FIG. 12 is a bottom plan view of an exemplary debris retention assembly from the perspective of the exemplary debris retention device installed therein.

Best shown in FIGS. 6, 7 and 8, the illustrated debris retention assembly 63 is configured to be inserted through a slot 74 and positioned within the lower tie plate cavity 62 between the inlet nozzle 60 and the lower tie plate grid 64. In this fashion, it is contemplated that an existing fuel assembly can be retrofitted with a debris retention assembly 63, and that a debris retention assembly 63 can be removed and cleaned or replaced during maintenance operations. A machined metal cover plate 69 is used to seal slot 74 into which the filter cartridge is first inserted and also used to further maintain the debris retention assembly 63 positioning within the lower tie plate 58. Referring to FIGS. 6 and 12, depressions (not shown) in the interior casting of the lower tie plate 58 correspond to detents 72 that protrude from one or more edges P along the periphery of the debris retention assembly 63. The detents 72 are configured to be received in the depressions to locate and secure the debris retention assembly 63 in position.

Figure 5:
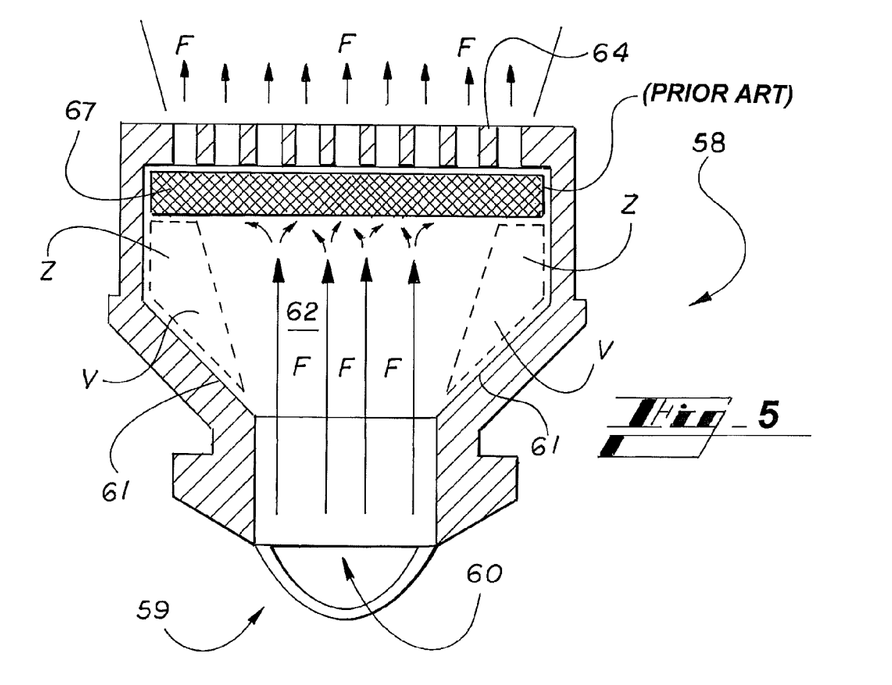
FIG. 5 is a cross-sectional schematic diagram of the debris filter of FIG. 4 in the lower tie plate, demonstrating a pattern of vortices created by incoming flow through an inlet nozzle impinging on the debris filter.

In certain embodiments, the inside wall of the housing 62 that houses the debris retention assembly 63 within a lower tie plate 58 is cast larger than most conventional designs, to achieve desired flow dynamics. Specifically, the high velocity of the flow through the inlet nozzle 60 encountering the relatively sudden area expansion in the enlarged housing 62 creates a jet impingement flow pattern that direct debris towards low flow zones Z around the inner periphery of the lower tie plate cavity 62. The low flow zones Z within the debris retention assembly 63 are less extensive than the low flow zones Z that would exist inside the lower tie plate 58 in the absence of the debris retention assembly 63. FIG. 5 shows a cross-sectional diagram showing the housing 62 as enlarged in accordance with this aspect of certain embodiments, but with a prior art debris filter cartridge 67 installed within a lower tie plate 58, to demonstrate the pattern of vortices that are created by jet impingement of the coolant flow F on the filter cartridge 67. Low flow zones Z are created as the direct coolant flow F moves through the enlarged housing 62. Debris particles accumulate on surfaces 61 in the low flow zone Z. FIG. 7 illustrates an exploded view of the same housing 62 with an exemplary debris retention assembly 63, and FIG. 8 shows the debris retention assembly in operation in the housing 62.

Figure 9:
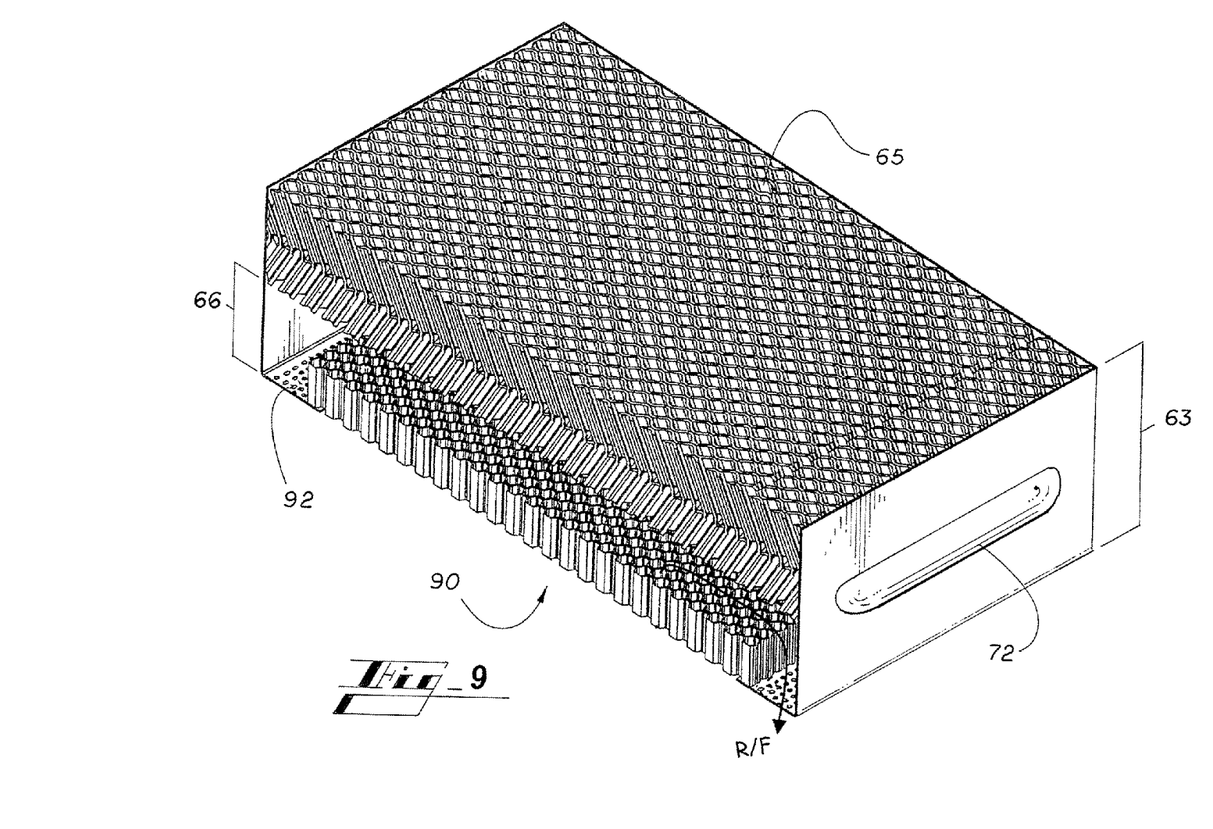
FIG. 9 is a cross-sectional, partial perspective view of one embodiment of a debris retention assembly, showing the backwash resistant cylinders and peripheral band for entrapping debris.
Figure 10:
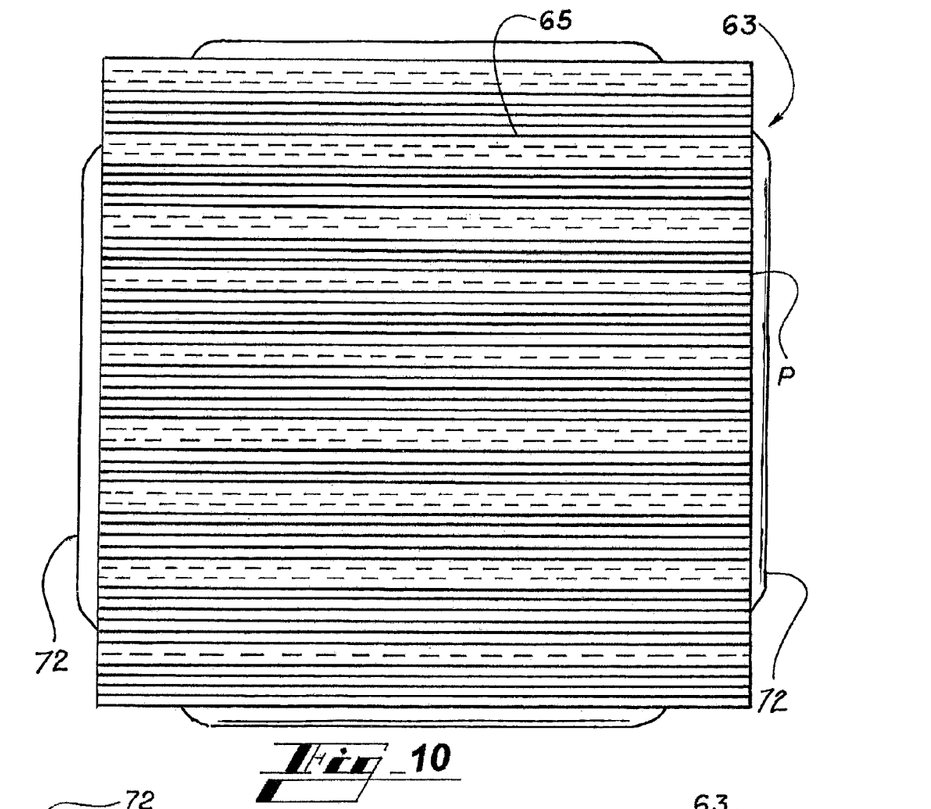
FIG. 10 is a top plan view of an exemplary debris retention assembly from the perspective of the exemplary debris filter installed therein.
Figure 11:
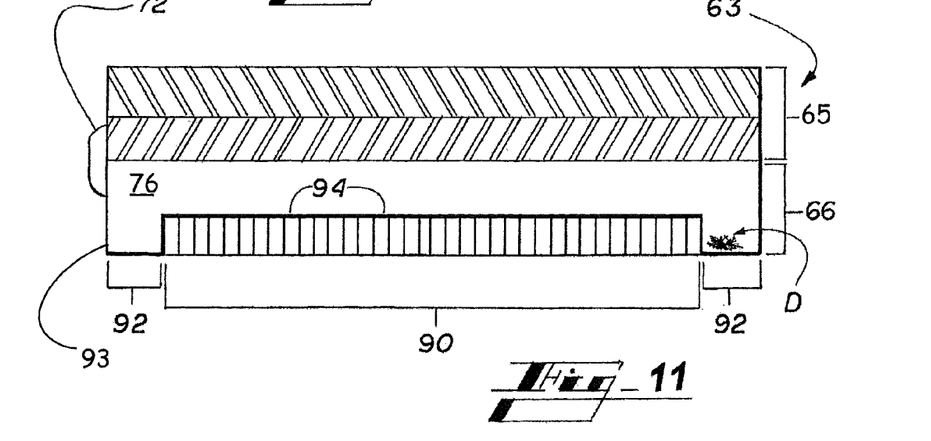
FIG. 11 is a cross-sectional side view of the debris retention assembly of FIGS. 9 and 10.

The central forward flow channel 90 allows coolant flow F to enter the debris retention assembly 63 in an unobstructed, relatively linear path and does not substantially change the direction or momentum of the coolant flow F. Any openings in the forward flow channel 90 can be much coarser by design, as compared to the size of openings in the debris filter 65. Consequently, forward coolant flow F may be sufficiently forceful to propel debris D through the forward flow channel 90 where the debris D then encounters and is impeded by the debris filter 65. Under stagnant or reverse flow R/F conditions, however, the forward flow channel 90 impedes the release of debris from the debris retention assembly 63, as these conditions generally do not generate sufficient force to propel the debris back through the forward flow channel 90. Accordingly, the forward flow channel 90 impedes backwash flow and the escape of debris D from the debris retention cavity 76 of the debris retention assembly 63, without substantially impacting normal flow dynamics within the lower tie plate cavity 62. In certain embodiments, for example, this backwash restrictive functionality can be achieved as shown in FIG. 9, wherein the forward flow channel 90 includes a matrix of cylindrical cells 94 that resist backwash and divert debris D to the periphery of the cavity 76 to be captured by the straining plates 92. As shown in FIG. 12, each cell 94 has a hexagonal cross-sectional shape, although other shapes may be suitable. In any event, the height, size, and thickness of the cells 94 is selected to allow linear flow (i.e., flow normal to the plane of forward flow channel 90) to pass unimpeded. In certain other embodiments, the cylindrical cells in the forward flow channel 90 may be replaced with apertures (not shown) the diameter of which is small enough to stop low velocity debris D but large enough to have negligible impact on flow of coolant under any conditions.

Referring to FIGS. 8 and 9, as the coolant flow F moves through forward flow channel 90, after exiting the surface of the forward flow channel 90, coolant flow F creates a pattern of vortices in the housing 62. In general, low flow zones Z are areas of low velocity, reverse flow R/F in the enlarged cavity 62 and are created at least in part by the vortices that naturally exist in the lower tie plate 58. The low flow zone is a volume where debris D that is blocked by the debris filter 65 can be collected in the straining plates 92 of the debris retention device 66.

Referring to FIGS. 7-9 and 11, the debris retention device 66 includes forward flow channel 90 that allows coolant flow F to flow substantially unobstructed into the debris retention device 66, and straining plates 92 that are positioned to extend at least partially across the low flow zones Z. Due to flow impingement, debris D (FIG. 11) propelled by the flow will be directed to the low flow zone Z resulting in an optimal position for the debris retention assembly 63. The forward flow channel 90 geometries (FIGS. 9 and 12) inhibit local flow and allow the entrapment of debris, preventing its release under stagnant, forward flow, and reverse flow conditions. Further, the dead zones 70 attract the debris as the sections with fine perforations 78 allow any back-water to cycle out of the cavity 76 without carrying the debris away. The perforations 78 in the debris retention cavity 76 may be directed to enhance the flushing characteristics of the debris off the surfaces 61, within the low flow zone Z, that accumulates within the cavity 62 of the lower tie plate 58 (see FIG. 8).

Operation

Referring to FIGS. 3, 7, and 8, during normal operation, coolant flows in direction F through the inlet nozzle 60, into the enlarged housing 62, through the debris retention assembly 63, and through the lower tie plate grid 64 before entering the fuel assembly 32. Debris passes into the debris retention assembly 63 through the forward flow channel 90 of the debris retention device 66 and is blocked by the debris filter 65 before the debris can enter the fuel assembly 32 and damage fuel rods 52 and 53.

The flow impingement at the surface of the debris filter 65 pushes the debris to the low flow zones Z in the interior of the debris retention assembly 63. As the debris reaches the low flow zones Z, the debris falls into the straining plates 92 of the debris retention device 66 that is positioned within the low flow zone Z. Debris that is impeded and that is held by the flow F proximate the center of the debris filter 65 may fall to the debris retention device 66 during stagnant or reverse flow, also known as a "backwash," such as when the fuel assembly 32 is moved. The forward flow channel 90 resists the release of debris under backwash.

Although described in the context of an integrated cartridge style debris retention assembly 63, the debris filter 65 and the debris retention device 66 can alternatively be separate devices that are installed in series within the lower tie plate housing. In such embodiments, individual components can be interchanged or replaced separately.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A debris retention assembly that is configured to be disposed across a flow path through a lower tie plate of a fuel assembly, wherein the flow path is substantially straight, the debris retention assembly comprising:

a debris filter configured to be disposed across the flow path, the debris filter comprising filter openings that are configured to impede debris; and a debris retention device positioned upstream from the debris filter with respect to a forward direction of flow along the flow path, the debris retention device comprising:

a forward flow channel that is configured to be positioned across the flow path such that the flow path is through the forward flow channel, the forward flow channel comprising at least one channel opening that is larger than the filter openings, wherein the at least one channel opening is configured to allow debris to flow therethrough to the debris filter in the forward flow direction; and a debris tray that opens to an upstream side of debris retention device, wherein the forward flow channel is positioned substantially at the center of the debris retention device and the debris tray is positioned substantially at the perimeter of the forward flow channel.

2. The debris retention assembly of claim 1, wherein the debris tray is perforated.

3. The debris retention assembly of claim 1, wherein the forward flow channel comprises a cylinder that is substantially parallel to the flow path, wherein the channel opening is through the cylinder.

4. The debris retention assembly of claim 1, wherein the forward flow channel includes a matrix of cylinders that are substantially parallel to the flow path, the at least one channel opening comprising a plurality of channel openings through the matrix of cylinders.

5. The debris retention assembly of claim 1, further comprising an enclosure that interconnects the debris filter and the debris retention device.

6. The debris retention assembly of claim 5, further comprising a debris retention cavity defined between the debris filter and the debris retention device.

7. The debris retention assembly of claim 1, wherein the forward flow channel is configured to allow flow to enter the debris retention assembly in an unobstructed, relatively linear path and does not substantially change the direction of the flow.

8. The debris retention assembly of claim 1, wherein the at least one opening includes at least one aperture.

9. The debris retention assembly of claim 1, wherein the debris tray is configured to allow flow therethrough and to impede debris.

10. A lower tie plate of a fuel assembly, comprising:
an inlet nozzle;
a housing comprising a cavity, wherein the cavity expands outwardly with respect to the inlet nozzle and defines a substantially straight flow path through the lower tie plate;
a debris filter positioned in the cavity and disposed across the flow path such that the flow path is through the debris filter, the debris filter comprising filter openings that are configured to impede debris; and
a debris retention device positioned in the cavity and upstream from the debris filter with respect to a forward direction of flow along the flow path, the debris retention device comprising:
a forward flow channel that is disposed across the flow path such that the flow path is through the forward flow channel, the forward flow channel comprising at least one channel opening that is larger than the filter openings, wherein the at least one channel opening is configured to allow debris to flow therethrough to the debris filter in the forward flow direction; and
a debris tray that opens to an upstream side of debris retention device,
wherein the forward flow channel is positioned substantially at the center of the debris retention device and the debris tray is positioned substantially at the perimeter of the forward flow channel.

11. The lower tie plate of claim 10, further comprising a debris retention cavity defined between the debris filter and the debris retention device.

12. The lower tie plate of claim 10, wherein the debris tray is configured to allow flow therethrough and to impede debris.

13. The lower tie plate of claim 10, wherein the forward flow channel includes a matrix of cylinders that are substantially parallel to the flow path, the at least one channel opening comprising a plurality of channel openings through the matrix of cylinders.

14. The lower tie plate of claim 10, wherein the debris tray is perforated.

15. The lower tie plate of claim 10, wherein the forward flow channel comprises a cylinder that is substantially parallel to the flow path, wherein the channel opening is through the cylinder.

16. The lower tie plate of claim 10, wherein the forward flow channel includes a matrix of cylinders that are substantially parallel to the flow path, the at least one channel opening comprising a plurality of channel openings through the matrix of cylinders.

17. The lower tie plate of claim 10, further comprising an enclosure that interconnects the debris filter and the debris retention device.

* * * * *